United States Patent [19]
Kleinhenz

[11] Patent Number: 5,915,950
[45] Date of Patent: Jun. 29, 1999

[54] FLY AND ROACH ELIMINATOR

[76] Inventor: Charles Kleinhenz, 8020 N. 400 West, P.O. Box 485, Taylorsville, Ind. 47280

[21] Appl. No.: 09/044,322

[22] Filed: Mar. 19, 1998

[51] Int. Cl.⁶ ................................................. A01M 1/06
[52] U.S. Cl. ............................................. 43/139; 43/107
[58] Field of Search .................................. 43/107, 132.1, 43/139; 15/319, 339, 402, 415.1

[56] References Cited

U.S. PATENT DOCUMENTS

| | | | |
|---|---|---|---|
| D. 263,068 | 2/1982 | Knebel | D22/122 |
| 1,071,620 | 8/1913 | Kingsland | 43/139 |
| 3,238,557 | 3/1966 | Foster | 15/339 |
| 4,127,961 | 12/1978 | Phillips | 43/139 |
| 4,175,352 | 11/1979 | Catlett | 43/139 |
| 4,391,017 | 7/1983 | Bruensicke | 15/415.1 |
| 4,625,453 | 12/1986 | Smith | 43/139 |
| 4,776,060 | 10/1988 | Chang | 15/339 |
| 4,825,582 | 5/1989 | Szynal | 43/140 |
| 4,979,330 | 12/1990 | Rorant | 43/139 |
| 5,023,973 | 6/1991 | Tsuchida et al. | 15/339 |
| 5,052,147 | 10/1991 | Broomfield et al. | 43/139 |
| 5,123,142 | 6/1992 | Miller | 15/415.1 |
| 5,123,201 | 6/1992 | Reiter | 43/107 |
| 5,142,731 | 9/1992 | Resch | 15/339 |
| 5,305,495 | 4/1994 | Nelsen et al. | 43/139 |
| 5,323,556 | 6/1994 | Carle | 43/139 |
| 5,329,725 | 7/1994 | Bible | 43/139 |
| 5,367,821 | 11/1994 | Ott | 43/139 |
| 5,410,775 | 5/1995 | Frazier | 15/339 |
| 5,411,150 | 5/1995 | Sigurdsson | 15/339 |

Primary Examiner—Michael J. Carone
Assistant Examiner—Darren W. Ark

[57] ABSTRACT

An insect eliminator is provided including a vacuum adapted to suction air from an inlet upon the actuation thereof. Also included is a bait compartment for attracting insects to a position where the insect may be suctioned. A timer is provided for actuating the vacuum intermittently.

7 Claims, 3 Drawing Sheets

FLY AND ROACH ELIMINATOR

BACKGROUND OF THE INVENTION

1. Field of the Invention

The present invention relates to bug vacuums and more particularly pertains to a new fly and roach eliminator for both attracting and capturing various insects.

2. Description of the Prior Art

The use of bug vacuums is known in the prior art. More specifically, bug vacuums heretofore devised and utilized are known to consist basically of familiar, expected and obvious structural configurations, notwithstanding the myriad of designs encompassed by the crowded prior art which have been developed for the fulfillment of countless objectives and requirements.

Known prior art bug vacuums include U. S. Pat. No. 4,979,330; U.S. Pat. No. 5,305,495; U.S. Pat. No. Des. 263,068;U.S. Pat. No. 5,052,147; U.S. Pat. No. 4,825,582; and U.S. Pat. No. 5,367,821.

In these respects, the fly and roach eliminator according to the present invention substantially departs from the conventional concepts and designs of the prior art, and in so doing provides an apparatus primarily developed for the purpose of both attracting and capturing various insects in indoors locations such as farm buildings, as well as in outdoors locations such as in farm fields.

SUMMARY OF THE INVENTION

In view of the foregoing disadvantages inherent in the known types of bug vacuums now present in the prior art, the present invention provides a new fly and roach eliminator construction wherein the same can be utilized for both attracting and capturing various insects.

The general purpose of the present invention, which will be described subsequently in greater detail, is to provide a new fly and roach eliminator apparatus and method which has many of the advantages of the bug vacuums mentioned heretofore and many novel features that result in a new fly and roach eliminator which is not anticipated, rendered obvious, suggested, or even implied by any of the prior art bug vacuums, either alone or in any combination thereof.

To attain this, the present invention generally comprises a vacuum having a rectangular configuration. As shown in FIG. 1, the vacuum is equipped with a plurality of feet for resting on a recipient surface. During use, the vacuum is adapted to draw air from an inlet upon the actuation thereof. Next provided is an elongated flexible hose having a first end connected to the inlet of the vacuum. A second end of the flexible hose is equipped with a rigid sleeve mounted thereon. A plurality of threaded grooves are formed in an outer surface of the sleeve for reasons that will become apparent hereinafter. FIG. 4 best shows a valve including an outer frusto-conical configuration and an axial bore formed therein. Such bore has an inboard extent with a plurality of threaded bores formed therein for releasably coupling with the sleeve of the hose. An intermediate extent of the bore is equipped with a square cross-section and a predetermined width. Associated therewith is a cylindrical outboard extent with a predetermined diameter less than the predetermined width of the intermediate extent. The valve further includes a square flap hingably coupled within the intermediate extent adjacent the outboard extent. In use, the flap is adapted to pivot only inwardly toward the inboard extent between a closed and open orientation. As shown in FIGS. 2 & 3, a bait compartment is provided including a planar top face and a planar bottom face each with a trapezoidal configuration. The bait compartment further includes a pair of tapering side faces mounted between the top face and bottom face. As such, a small inboard opening is defined which is coupled about an inboard end of the outer periphery of the valve. Further, a large outboard opening is defined for provided an entrance. For containing bait to attract insects, the bottom face has an upper surface with a circular recess formed therein. Note FIG. 3. Finally, situated within and connected to the vacuum is an actuator means for actuating the same intermittently following intervals of a predetermined duration. This allows for suctioning of the insects from the bait compartment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fly and roach eliminator apparatus and method which has many of the advantages of the bug vacuums mentioned heretofore and many novel features that result in a new fly and roach eliminator which is not anticipated, rendered obvious, suggested, or even implied by any of the prior art bug vacuums, either alone or in any combination thereof.

It is another object of the present invention to provide a new fly and roach eliminator which may be easily and efficiently manufactured and marketed.

It is a further object of the present invention to provide a new fly and roach eliminator which is of a durable and reliable construction.

An even further object of the present invention is to provide a new fly and roach eliminator which is susceptible of a low cost of manufacture with regard to both materials and labor, and which accordingly is then susceptible of low prices of sale to the consuming public, thereby making such fly and roach eliminator economically available to the buying public.

Still yet another object of the present invention is to provide a new fly and roach eliminator which provides in the apparatuses and methods of the prior art some of the advantages thereof, while simultaneously overcoming some of the disadvantages normally associated therewith.

Still another object of the present invention is to provide a new fly and roach eliminator for both attracting and capturing various insects.

Even still another object of the present invention is to provide a new fly and roach eliminator that includes a vacuum adapted to suction air from an inlet upon the actuation thereof. Also included is a bait compartment for attracting insects to a position where the insect may be suctioned. A timer is provided for actuating the vacuum intermittently.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
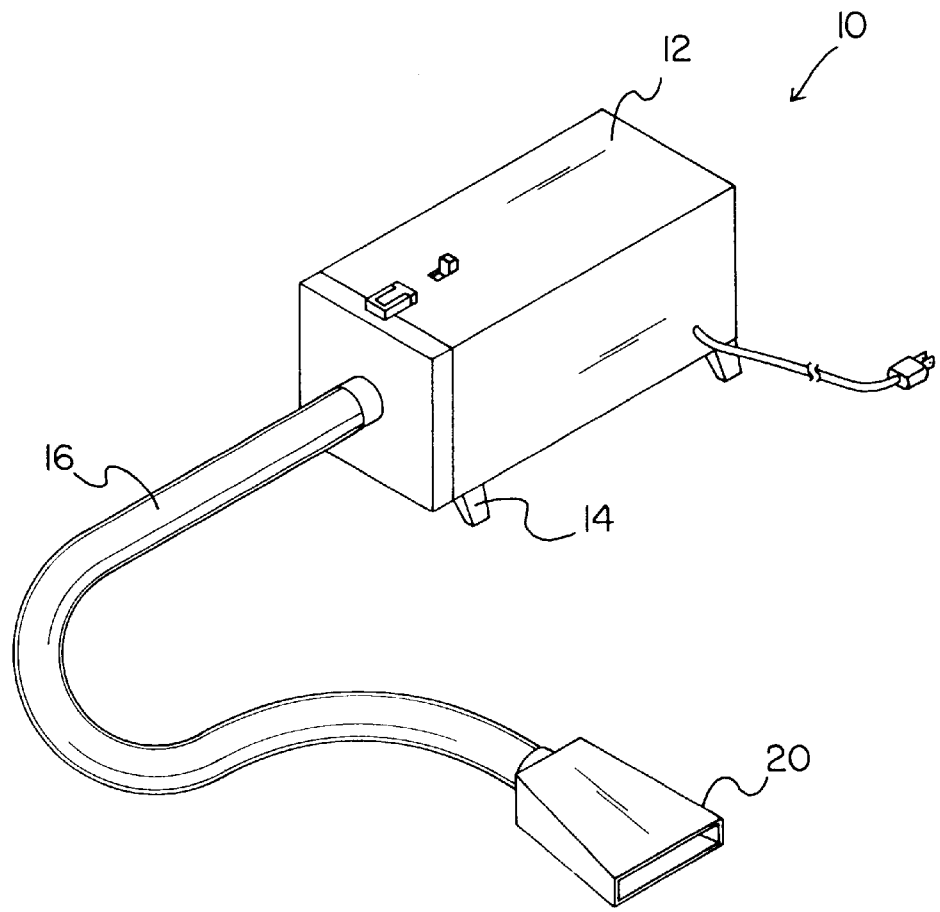
FIG. 1 is a perspective view of a new fly and roach eliminator according to the present invention.

With reference now to the drawings, and in particular to FIGS. 1 through 5 thereof, a new fly and roach eliminator embodying the principles and concepts of the present invention and generally designated by the reference numeral 10 will be described.

The present invention, designated as numeral 10, includes a vacuum 12 having a rectangular configuration. As shown in FIG. 1, the vacuum is equipped with a plurality of feet 14 for resting on a recipient surface such that the vacuum is elevated. During use, the vacuum is adapted to draw air from an inlet upon the actuation thereof. A disposable cloth bag 15 is preferably disposed within the vacuum for containing insects as will become apparent.

Next provided is an elongated flexible hose 16 having a first end connected to the inlet of the vacuum. A second end of the flexible hose is equipped with a rigid sleeve mounted thereon. A plurality of threaded grooves are formed in an outer surface of the sleeve for reasons that will become apparent hereinafter. In the preferred embodiment, the hose has a length of no less than 3–4 feet and further has an inner surface that is coated with TEFLON.

Figure 4:
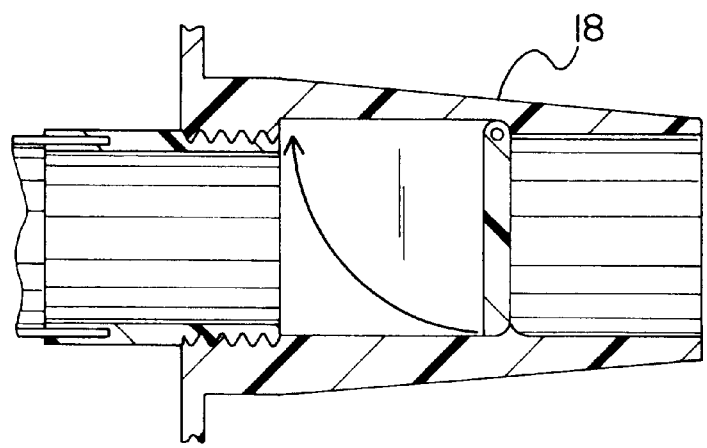
FIG. 4 is a side cross-sectional view of the valve of the present invention taken along line 4—4 shown in FIG. 3.

FIG. 4 best shows a valve 18 including an outer frusto-conical configuration and an axial bore formed therein. Such bore has an inboard extent with a threaded bore formed therein for releasably coupling with the sleeve of the hose. An intermediate extent of the bore is equipped with a square cross-section and a predetermined width. Associated therewith is a cylindrical outboard extent with a predetermined diameter less than the predetermined width of the intermediate extent. The valve further includes a square flap hingably coupled within the intermediate extent adjacent the outboard extent. In use, the flap is adapted to pivot only inwardly toward the inboard extent between a closed and open orientation. Preferably, the flap is spring biased and is urged closed.

Figure 2:
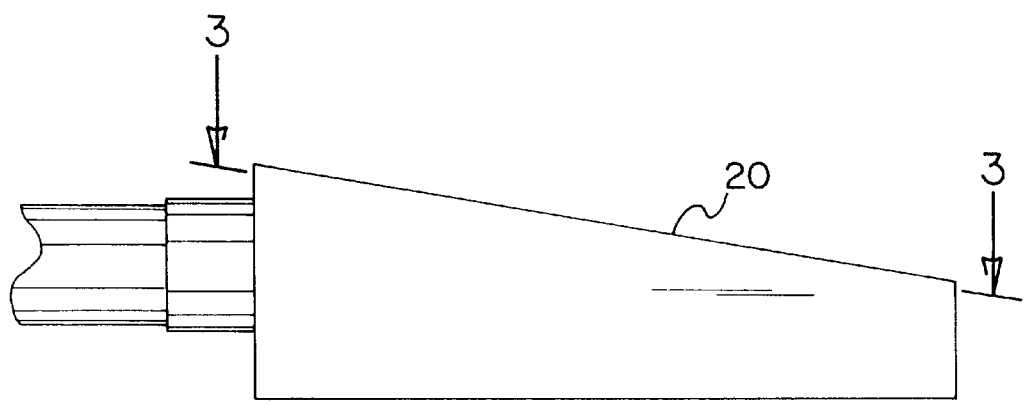
FIG. 2 is a side view of the present invention.
Figure 3:
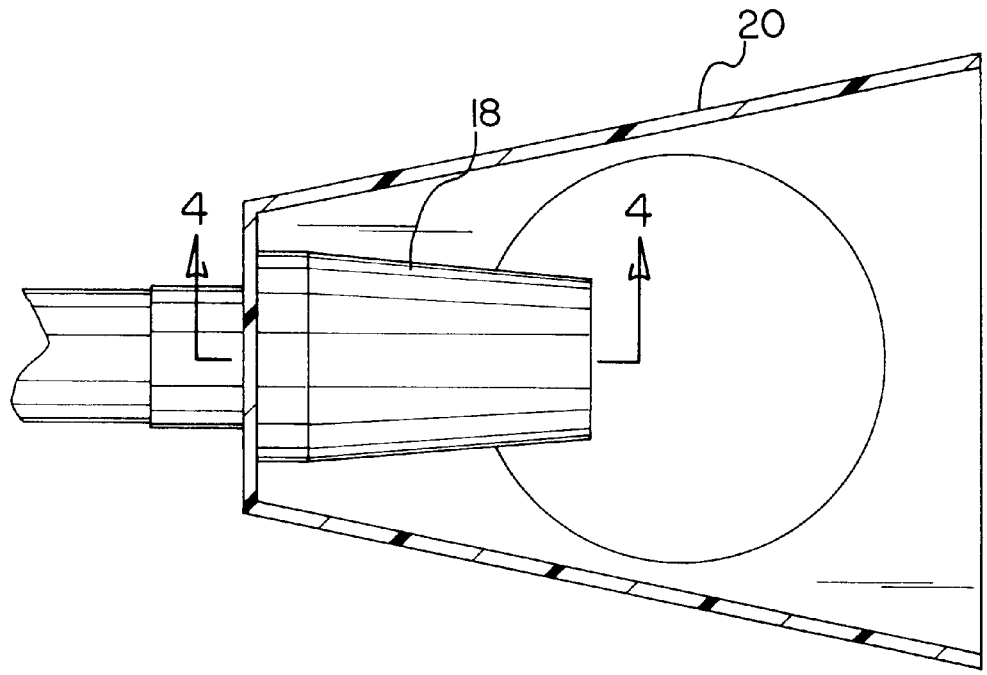
FIG. 3 is a top cross-sectional view of the present invention taken along line 3—3 shown in FIG. 2.

As shown in FIGS. 2 & 3, a bait compartment 20 is provided including a planar top face and a planar bottom face each with a trapezoidal configuration. The bait compartment further includes a pair of tapering side faces mounted between the top face and bottom face. As such, a small inboard opening is defined which is coupled about an inboard end of the outer periphery of the valve. Further, a large outboard opening is defined for provided an opening into the bait compartment. For containing bait to attract insects, the bottom face of the compartment has an upper surface with a circular recess formed therein. Note FIG. 3. Ideally, the bait consists of an odor producing material.

Finally, situated within and connected to the vacuum is an unillustrated actuator means for actuating the same intermittently for periods of 2–3 minutes following intervals of a predetermined duration. Such intervals may be 1, 2, 5, or 10 minutes in duration.

This allows for the suctioning of the insects from the bait compartment. In the preferred embodiment, the intervals are selected by the user by way of a dial or the like. The actuator means further includes a manual cut off switch for unconditionally precluding operation of the vacuum.

Figure 5:
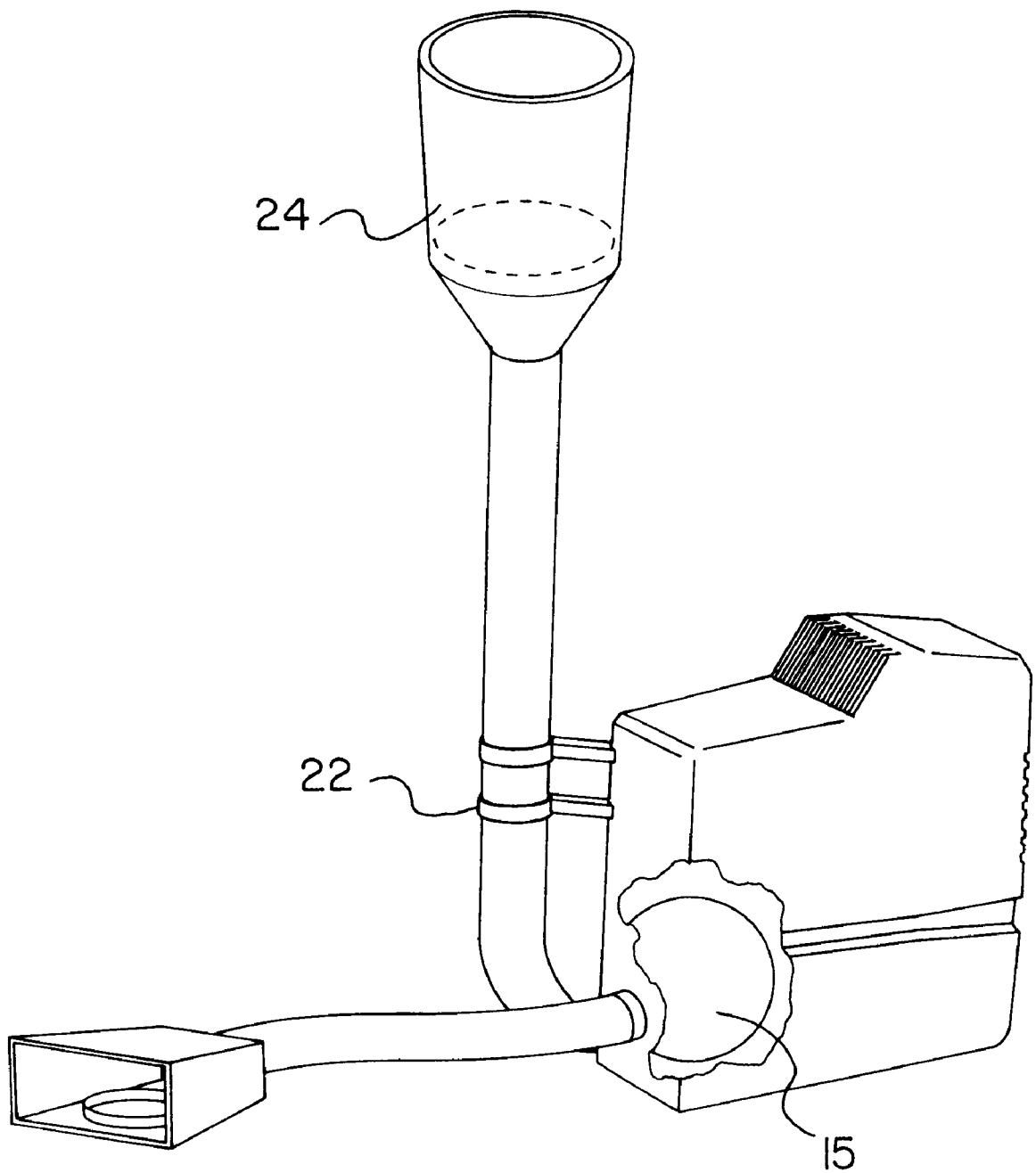
FIG. 5 is an alternate embodiment of the present invention.

In an alternate embodiment, as shown in FIG. 5, a brace 22 is mounted on the vacuum for releasably securing the tube in a vertical orientation. It should be noted that in the present embodiment, the tube has a greater resiliency. Further, the bait compartment of the previous embodiment is replaceable with a meshed screen 24 for flies and the like to rest on. It should be noted that carbon dioxide may be used as bait in the present embodiment for the purpose of attracting mosquitoes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insect eliminator comprising:

a vacuum adapted to suction air from an inlet upon the actuation thereof;

a valve including a bore having an inboard extent, an intermediate extent, and an outboard extent, the valve further including a square flap hingedly coupled within the intermediate extent adjacent the outboard extent and adapted to pivot only inwardly toward the inboard extent between a closed and open orientation;

a bait compartment with a bottom face having an upper surface with a circular recess formed therein for containing bait for attracting insects thereto;

a flexible hose connecting the inlet to the inboard extent and the valve being connected to the bait compartment; and an actuator means situated within and connected to the vacuum for actuating the vacuum intermittently following intervals of a predetermined duration for suctioning the insects from the bait compartment.

2. An apparatus, comprising:

a vacuum having an inlet;

a mechanical housing in fluid communication with said inlet, said housing having an opening adapted for allowing passage of a pest into said housing;

said housing having a valve including a bore having an inboard extent, an intermediate extent, and an outboard extent, the valve further including a square flap hingedly coupled within the intermediate extent adjacent the outboard extent and adapted to pivot only inwardly toward the inboard extent between a closed and open orientation;

said housing having a bait compartment with a bottom face having an upper surface with a circular recess formed therein for containing an attractant for attracting insects thereto;

an attractant within said bait compartment adapted for attracting the pest;

said vacuum being for removing the pest from said mechanical housing; and an actuator means situated within and connected to the vacuum for actuating the vacuum intermittently following intervals of a predetermined duration for suctioning the insects from the bait compartment.

3. The apparatus of claim 2, wherein said attractant includes an odor producing material.

4. The apparatus of claim 2, wherein said housing is spaced from said vacuum; and said vacuum is selectively actuated to suction.

5. The apparatus of claim 4:

which further includes a flexible hose coupling from said inlet to said mechanical housing.

6. An apparatus comprising:

a vacuum having an inlet;

a mechanical housing in fluid communication with said inlet, said housing having an opening adapted for allowing passage of a pest into said housing;

an attractant within said housing adapted for attracting the pest;

said vacuum for removing the pest from said mechanical housing;

said attractant including an odor producing material to attract or lure insects into inlet;

said housing having a bait holder for receiving said attractant therein and being spaced from said vacuum; and said vacuum is selectively actuated to suction;

a flexible hose coupling from said inlet to said mechanical housing;

a valve disposed in fluid communication with said flexible hose; and an actuator controlling the operation of said vacuum; and wherein said valve has an aperture formed therethrough, said aperture has an inboard extent, an intermediate extent and an outboard extent, said inboard extent releasably coupling with said hose, said intermediate extent has a width, and said outboard extent has a diameter less than said width, said valve including a pivotal member coupled within the intermediate extent and adapted to pivot only inwardly toward the inboard extent between a closed and open orientation.

7. An insect eliminator comprising, in combination:

a vacuum having a rectangular configuration with a plurality of feet for resting on a recipient surface, the vacuum adapted to draw air from an inlet upon the actuation thereof;

an elongated flexible hose having a first end connected to the inlet of the vacuum and a second end with a rigid sleeve mounted thereon with a plurality of threaded grooves formed in an outer surface thereof;

a valve including an outer frusto-conical configuration and an axial bore formed therein, the bore having an inboard extent with a threaded bore formed therein for releasably coupling with the sleeve of the hose, an intermediate extent with a square cross-section and a predetermined width, and a cylindrical outboard extent with a predetermined diameter less than the predetermined width, the valve further including a square flap hingedly coupled within the intermediate extent adjacent the outboard extent and adapted to pivot only inwardly toward the inboard extent between a closed and open orientation;

a bait compartment with a planar top face and a planar bottom face each with a trapezoidal configuration, the bait compartment further including a pair of tapering side faces mounted between the top face and bottom face for defining a small inboard opening coupled about an inboard end of the outer periphery of the valve and a large outboard opening, the bottom face having an upper surface with a circular recess formed therein for containing bait for attracting insects thereto; and an actuator means situated within and connected to the vacuum for actuating the vacuum intermittently following intervals of a predetermined duration for suctioning the insects from the bait compartment.

* * * * *